US006965983B2

(12) United States Patent
Lin

(10) Patent No.: US 6,965,983 B2
(45) Date of Patent: Nov. 15, 2005

(54) SIMULTANEOUSLY SETTING PREFETCH ADDRESS AND FETCH ADDRESS PIPELINED STAGES UPON BRANCH

(75) Inventor: Hung-Yu Lin, Hsin-Chu Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 375 days.

(21) Appl. No.: 10/248,769

(22) Filed: Feb. 16, 2003

(65) Prior Publication Data

US 2004/0168042 A1 Aug. 26, 2004

(51) Int. Cl.[7] .................................................. G06F 9/32

(52) U.S. Cl. ....................... 712/207; 711/213; 712/205; 712/237; 712/240

(58) Field of Search .......................... 711/213; 712/205, 712/207, 237, 240

(56) References Cited

U.S. PATENT DOCUMENTS 4,943,908 A * 7/1990 Emma et al. ............... 712/240
5,237,666 A * 8/1993 Suzuki et al. ............... 712/240
5,642,500 A * 6/1997 Inoue ......................... 712/233
2001/0027515 A1 * 10/2001 Ukai et al. .................. 712/207

* cited by examiner

*Primary Examiner*—Kenneth S. Kim
(74) *Attorney, Agent, or Firm*—Winston Hsu

(57) ABSTRACT

A pipelined CPU includes a pre-fetch (PF) stage for performing branch prediction, and an instruction fetch (IF) stage for fetching instructions that are to be later processed by an execution (EX) stage. The PF stage has a PF address (PFA) register for storing the address of an instruction being processed by the PF stage, and the IF stage has an IF address (IFA) register for storing the address of an instruction to be fetched for later execution. The CPU also includes address register control (ARC) circuitry for setting the contents of the PFA and the IFA. The ARC accepts branch-prediction results from the PF stage to determine the subsequent contents of the PFA and the IFA. If the PF stage predicts a branch, then the ARC sets the next address of the PFA to be sequentially after a predicted branch address, and simultaneously sets the next address of the IFA to be the predicted branch address.

14 Claims, 2 Drawing Sheets

SIMULTANEOUSLY SETTING PREFETCH ADDRESS AND FETCH ADDRESS PIPELINED STAGES UPON BRANCH

BACKGROUND OF INVENTION

1. Field of the Invention

The present invention relates to pipelined processor architectures. More specifically, a pipelined architecture is disclosed that has a pre-fetch stage that is used to perform branch prediction, and which provides results to a separate instruction fetch stage.

2. Description of the Prior Art

Numerous methods have been developed to increase the computing power of central processing units (CPUs). One development that has gained wide use is the concept of instruction pipelines. The use of such pipelines necessarily requires some type of instruction branch prediction so as to prevent pipeline stalls. Various methods may be employed to perform branch prediction. For example, U.S. Pat. No. 6,263,427B1 to Sean P. Cummins et al., included herein by reference, discloses a branch target buffer (BTB) that is used to index possible branch instructions and to obtain corresponding target addresses and history information.

Because of their inherent complexity, the prior art branch prediction mechanisms can themselves lead to pipeline stalls. For example, the typical branch prediction stage includes instruction fetching, BTB access and hit determination, target address acquisition, and prediction mechanisms (potentially based upon history information) to generate a next instruction address. Such a large amount of work cannot always be performed in a single clock cycle, and so pipeline stalls result. These stalls greatly reduce the efficiency of the CPU, especially when executing tight loops. The above-noted invention of Cummins et al. utilizes a new BTB mechanism to avoid such pipeline stalls; however, the new BTB mechanism requires larger BTB table entries to store more information, and introduces greater complexity in the overall branch prediction design.

SUMMARY OF THE INVENTION

It is therefore a primary objective of this invention to provide an improved instruction pipeline design that may be easily implemented so as to reduce design complexity, while ensuring that pipeline stalls do not occur during branch prediction.

Briefly summarized, the preferred embodiment of the present invention discloses a pipelined central processing unit (CPU), and corresponding method. The pipelined CPU includes a pre-fetch (PF) stage for performing branch prediction, and an instruction fetch (IF) stage for fetching instructions that are to be later processed by an execution (EX) stage. The PF stage has a PF address (PFA) register for storing the address of an instruction being processed by the PF stage, and the IF stage has an IF address (IFA) register for storing the address of an instruction to be fetched for later execution. The CPU also includes address register control (ARC) circuitry for setting the contents of the PFA and the IFA. The ARC accepts branch-prediction results as obtained from the PF stage and stored in the IF stage to determine the subsequent contents of the PFA and the IFA. If the branch-prediction results indicate that no branching is to occur, then the ARC sets a next address of the PFA to be sequentially after a current address of the PFA, and sets a next address of the IFA be the current address of the PFA. If the branch-prediction results indicate that a branch is to occur, then the ARC sets the next address of the PFA to be sequentially after a predicted branch address, and sets the next address of the IFA be the predicted branch address.

It is an advantage of the present invention that by providing a pre-fetch stage with a program counter (i.e., address register) that is independent of the instruction fetch stage, the present invention is able to utilize a conventional BTB structure while ensuring that the entire branch prediction procedure occurs in a single clock cycle. Furthermore, in the event that the branch prediction is found to be at error at the execution stage, the present invention use of the two program counters PFA and IFA reduces by one the cycle penalty that would otherwise be incurred when flushing the pipeline.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
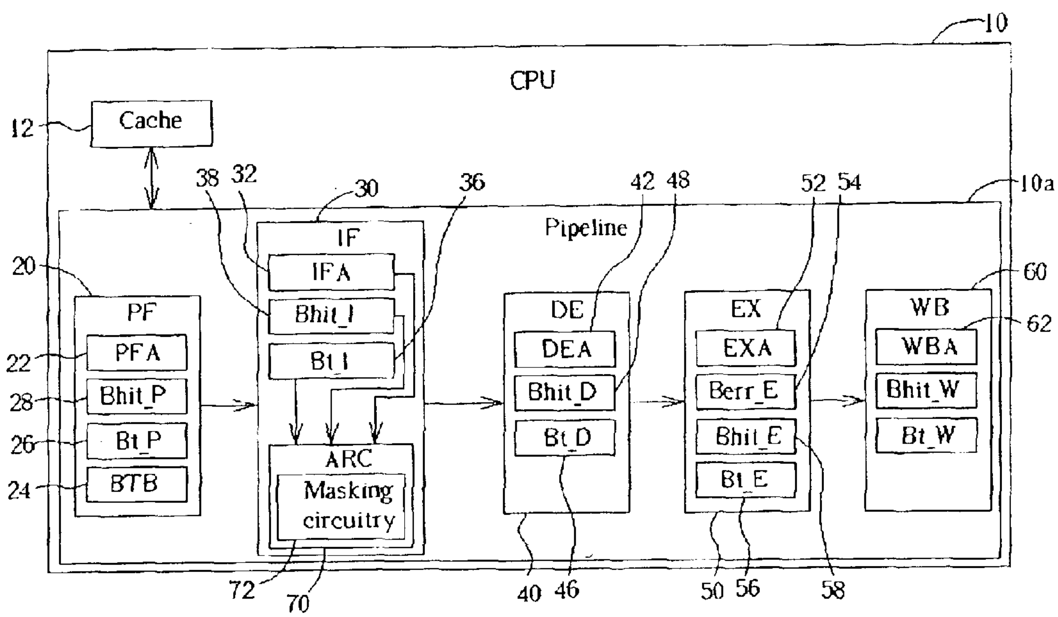
FIG. 1 is a simple block diagram of an instruction pipeline according to the present invention.

Although the present invention particularly deals with pipeline branch prediction, it will be appreciated that many methods exist to perform the actual branch prediction algorithm. Typically, these methods involve the use of a branch table buffer (BTB) and associated indexing and processing circuitry to obtain a next instruction address (i.e., a target address). It is beyond the intended scope of this invention to detail the inner workings of such branch prediction circuitry, and the utilization of conventional circuitry may be assumed in this case. Additionally, it may be assumed that the present invention pipeline interfaces in a conventional manner with external circuitry to enable the fetching of instructions (as from a cache/bus arrangement), and the fetching of localized data (as from the BTB). Please refer to FIG. 1. FIG. 1 is a simple block diagram of a CPU 10 having an instruction pipeline 10*a* according to the present invention. It is part of the method of the present invention to explicitly provide a pre-fetch (PF) stage 20 that is responsible for performing branch prediction, and an instruction fetch (IF) stage 30 immediately after the PF stage 20, the IF stage 30 actually fetching instructions (say, from a cache 12) that are to be later executed by an execution (EX) stage 50. The PF stage 20 has a corresponding pre-fetch address (PFA) register 22 that holds the address of an instruction upon which the PF stage 20 is working. That is, the PF stage 20 performs branch prediction for the instruction address held in the PFA 22. Similarly, the IF stage 30 contains an instruction fetch address (IFA) register 32 that holds the address of the instruction that the IF stage 30 is to fetch. It is important to note that the PFA 22 and the IFA 32 are independent of each other. More specifically, the PFA 22 may hold an address for an instruction that is never intended to be subsequently passed on to the EX stage 50. On the other hand, an address held in the IFA 32 points to an instruction that is always intended for the EX stage 50. Of course, whether or not such an instruction is actually eventually executed at the EX stage 50 will depend in no small part upon whether or not the branch prediction performed at the PF stage 20 was, in fact, correct. Nevertheless, and in contrast to prior pipeline designs, an address held in the PFA 22 will not necessarily always be passed on to the IFA 32 in the next pipeline cycle (this is in addition to the trivial case of pipeline flushing).

The pipeline 10*a* further includes a decode (DE) stage 40, and a write-back (WB) stage 60. The DE stage 40 handles decoding of opcodes, operands, addresses, etc, of the instruction that was fetched by the IF stage 30. The WB stage 60 writes back to memory and registers the results obtained in the EX stage 50 from an executed instruction. The WB stage 60 also updates data used by the PF stage 20 to perform branch prediction, such as updating a branch prediction buffer (BTB) 24. In general, and for each clock tick, at each stage the results of that stage are passed on to the next stage, along with the address of the instruction being worked upon. This action is consistent with prior art designs. Hence, the IF stage 30 passes the results of working upon an address in the IFA register 32 to the DE stage 40, along with the instruction address in the IFA 32, which is used to set the contents of a DE address (DEA) register 42. One clock tick later, the DE stage 40 passes its results, and the same instruction address in the DEA 42, on to the EX stage 50, which stores the instruction address in an EX address (EXA) register 52. After one clock tick, the EX stage 50 passes its results, and the instruction address in the EXA 52, on to the WB stage 60. The contents of the EXA 52 are thus passed on to a WB address (WBA) register 62. Beyond the trivial case of pipeline flushing, which is discussed later, an exception to this course of events occurs between the PF stage 20 and the IF stage 30, which is in sharp contrast to prior art pipeline designs. If at a clock tick "n" the PFA register 22 holds an address "x", absent pipeline flushing one still cannot assume for the present invention pipeline 10*a* that at clock tick "n+1" that the IFA register 32 will hold the instruction address "x". This functionality is discussed in more detail below.

The CPU 10 further includes address register control (ARC) circuitry 70, and it is the job of the ARC 70 to provide appropriate address values to the PFA 22 and IFA 32. In addition, the ARC circuitry 70 could also provide address values to the DEA 42, EXA 52 and WBA 62 stages, but such functionality is analogous to the prior art, and so is not elaborated upon here. Consequently, the ARC circuitry 70 is shown disposed within the IF stage 30, as the ARC circuitry 70 primarily employs pipeline results held by the IF stage 30 to perform the address calculation for the PFA 22 and IFA 32. The ARC 70 also uses results obtained from the EX stage 50 to determine the contents of the PFA 22 and the IFA 32 registers. Before proceeding, the following terminology is introduced. The term "IFA_cr" indicates the value held in the IFA register 32 at a particular clock cycle that may be thought of as the "current" clock cycle. The term "IFA_nx" indicates the value held within the IFA register 32 one clock cycle later, i.e., the "next" clock cycle. Similar terminology is used to represent the time-dependent values of other registers, i.e., "PFA_cr" and "PFA_nx" represent address values held in the PFA register 22 at a clock cycle "n" and "n+1", respectively. With regards to instructions, subsequent instructions are indicated by the usage of "+1" and "+2" from a base address. For example, if an instruction is at "addr", then the terminology "addr+1" is used to indicate the address of the first instruction after that at "addr". Similarly, the term "addr+2" is used to indicate the address of the second instruction after that at "addr". The amount that must actually be added to "addr" to obtain the appropriate addresses for "addr+1" and "addr+2" will depend upon the instruction set, and is simply a design choice.

The PF stage 20 performs branch prediction for an instruction whose address is held in the PFA register 22. Brach prediction can be performed in a standard manner. For example, the lower bits of the PFA 22 can be used to index into the branch table buffer (BTB) 24. The upper bits of the PFA 22 can be compared against TAG entries in the BTB 24 to determine if there is a hit. Based upon corresponding history information, the branch can be calculated as taken or not taken. If the branch is taken, the target address is placed into a branch target register (Bt_P) 26, and a bit Bhit_P 28 is set to one. If no branch is taken, then the bit Bhit_P 28 is set to zero. Note that the WB stage 60 updates the BTB 24 based upon branch results obtained from the EX stage 50. Such functionality of the WB stage 60 is well known in the art, and so is not discussed in any more detail.

Although the PF stage 20 performs branch prediction, no actual fetching of the associated instruction is performed. The primary reason for this is that the PF stage 20 is quite complex, and so is a long critical path. Attempting to have the PF stage 20 perform additional functions will force either the frequency of the CPU 10 to be reduced, or introduction pipeline stalls. Hence, instruction fetching is left to the subsequent IF stage 30, which has a much shorter critical path. The IF stage 30 explicitly fetches the instruction located at the address held in the IFA register 32. This instruction may be fetched, ideally, from a fast cache 12 so as to avoid any pipeline 10*a* stalls. By avoiding instruction fetching, the PF stage 20 is provided ample time to perform branch prediction. In addition, because the critical path in the IF stage 30 is relatively short, the ARC circuitry 70 is placed within the IF stage 30 to determine PFA_nx and IFA_nx; that is, the values of the PFA 22 and IFA 32 in the subsequent clock cycle.

The ARC 70 utilizes the contents of Bt_I 36, Bhit_I 38, and a bit Berr_E 54 in the EX stage 50 to determine the contents of the IFA 32 and PFA 22 registers. The bit Berr_E 54 indicates that branch prediction failure occurred for the instruction at the address in the EXA 52. The manner used to set the bit Berr_E 54 should be well-known to those skilled in the art, but generally involves sequentially passing the bit Bhit_P 28 from the PF stage 20 to the IF stage 30, to the DE stage 40 and finally to the EX stage 50. That is, the bucket-brigade type action that is performed with each clock cycle handing on the contents of the PFA 22, IFA 32, DEA 42, EXA 52 and WRA 62, is also performed with the branch prediction bits Bhit_P 28 and Bt_P 26. Hence, the current value of Bhit_I 38 and Bt_I 36 are obtained from the previous values of Bhit_P 28 and Bt_P 26, respectively. Similarly, Bhit_D 48 and Bt_D 46 are obtained from the previous values of Bhit_I 38 and Bt_I 36. Finally, Bhit_E 58 and Bt_E 56 are obtained from the previous values of Bhit_D 48 and Bt_D 46, respectively. If the passed bit Bhit_E 58 does not agree with the branch actually performed at the EX stage 50, then the bit Berr_E 54 is set to one. Otherwise, the bit Berr_E 54 is set to zero. The ARC circuitry employs the following method to determine the contents of the IFA 32 and PFA 22 registers:

1)If Bhit_I 38 is zero, and Berr_E 54 is zero, then: PFA_nx=PFA_cr+1, and IFA_nx=PFA_cr.

2)Otherwise, if Berr_E 54 is zero, then: PFA_nx=Bt_I+1, and IFA_nx=Bt_I.

3)Otherwise: IFA_nx=EXA_cr+1, and PFA_nx=EXA_cr+2.

Masking circuitry 72 is used to ignore the result of Bhit_P 28 if either Bhit_I 38 is one, or Berr_E 54 is one. That is, the masking circuitry 72 is used to enforce the following condition:

4) If Bhit_I 38 is one, or Berr_E 54 is one, then: Bhit_I_nx=0.

Figure 2:
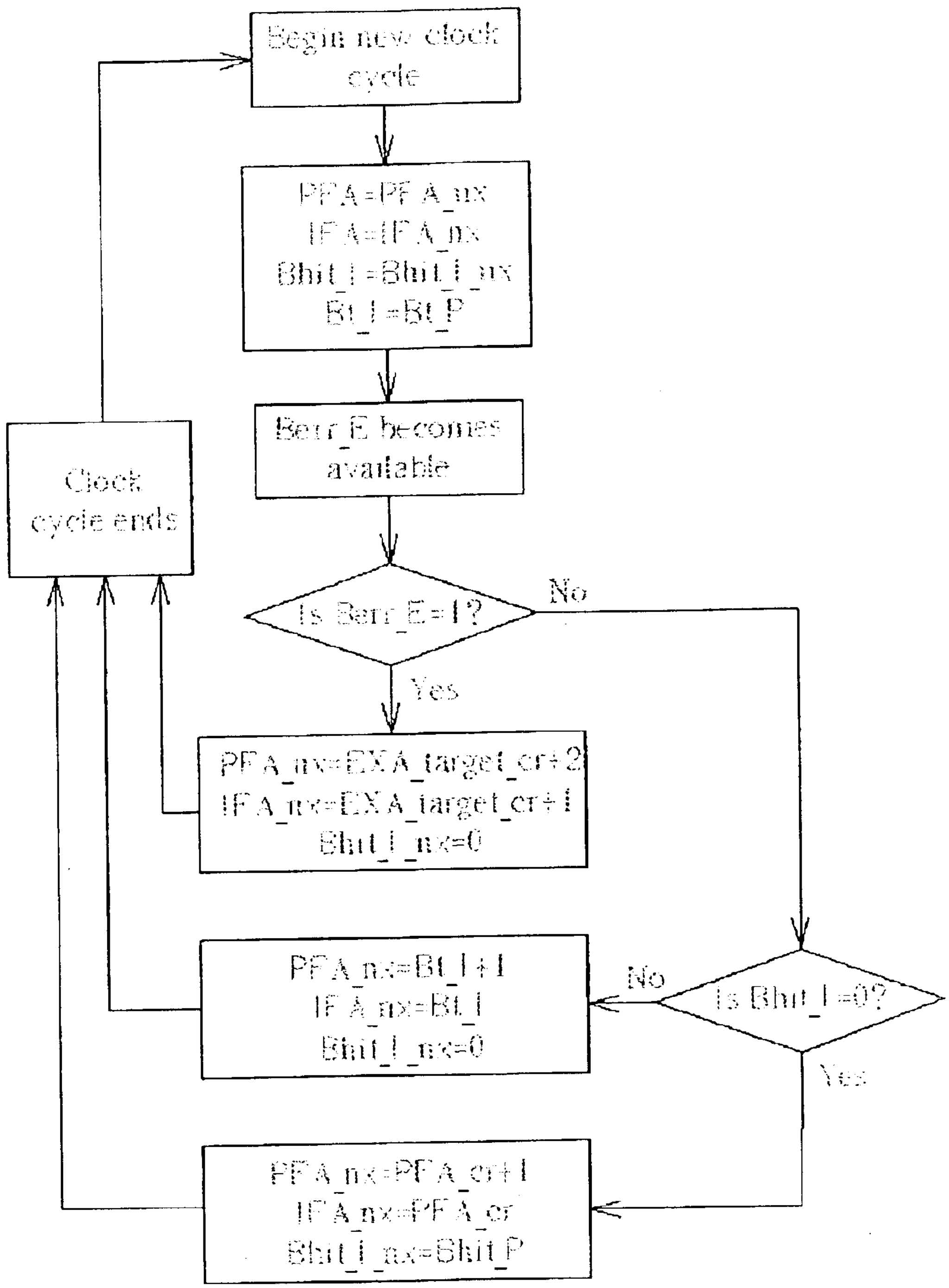
FIG. 2 is a flow chart for the present invention method.

The logical flow of rules (1) through (4) is depicted in FIG. 2, which is a flow chart for the present invention method. Asian example, please refer to the following Table 1 in conjunction with FIGS. 1 and 2. Table 1 shows the contents of the pipeline 10*a* over the course of a few instructions in which branch prediction occurs for an instruction at address "n". All other instructions are assumed not to branch. The branch prediction determines that the target branch address is "t", and this branch prediction is assumed correct.

TABLE 1

| Clock cycle | PFA | IFA | DEA | EXA | WBA | Bhit_I | Bt_I | Berr_E |
|---|---|---|---|---|---|---|---|---|
| C | x2 | X3 | x4 | x5 | x6 | 0 | n/a | 0 |
| C + 1 | x1 | X2 | x3 | x4 | x5 | 0 | n/a | 0 |
| C + 2 | n | X1 | x2 | x3 | x4 | 0 | n/a | 0 |
| C + 3 | n + 1 | n | x1 | x2 | x3 | 1 | t | 0 |
| C + 4 | t + 1 | t | n | x1 | x2 | 0 | n/a | 0 |
| C + 5 | t + 2 | t + 1 | t | n | x1 | 0 | n/a | 0 |
| C + 6 | t + 3 | t + 2 | t + 1 | t | n | 0 | n/a | 0 |
| C + 7 | t + 4 | t + 3 | t + 2 | t + 1 | t | 0 | n/a | 0 |

Of particular note is the content of the PFA register 22 at time C+3. At the end of clock cycle C+2, Bhit_P 28 becomes a one, and hence in clock cycle C+3 Bhit_I 38 becomes a one, and Bt_I 36 becomes "t". However, during the clock cycle C+2, both Bhit_I 38 and Berr_E 54 are zero. Hence, the ARC circuitry 74 applies rule (1) to clock cycle C+3. During the clock cycle C+3, the PF stage 20 is incorrectly performing branch prediction for an instruction at address "n+1". Hence, any sort of branch prediction for the instruction at address "t" at time C+4 would likely be incorrect. Condition (4) above chooses to enforce the assumption that, if a branch is predicted, then the target address does not also branch. In particular, at time C+3, because Bhit_I 38 is one, the contents of Bhit_I 38 at time C+4 are forced to be zero. That is, Bhit_P 28 is ignored (i.e., masked) when clocking in the values at the beginning of clock cycle C+4. This may be done in a variety of ways. For example, the Bhit_I register 38 may be directly filled with a zero, or the ARC circuitry 70 may "turn off" the PF stage 20. In either case, because of the ARC circuitry 70 obeying condition (2) above at the end of cycle C+3, at time C+4 the IFA register 32 properly holds address "t" rather than address "n+1". Pipeline stalls are thereby averted. In Table 1, along the column for Bt_I 36, the term "n/a" indicates "not applicable", as the contents of Bt_I 36 are unimportant when Bhit_I 38 is zero.

Table 2 below is similar to Table 1 above, but shows what happens when incorrect branch prediction is detected at the EX stage 50. In Table 2, an instruction at address "n" is assumed to branch to target address "t". However, when this instruction reaches the EX stage 50, the EX stage 50 determines that no branch occurs, and that execution should proceed to the subsequent instruction at "n+1". This is a common occurrence in pipelines, and handling such events is well known in the art. Specifically, the pipeline 10*a* needs to be flushed, and the correct instructions inserted from the front end of the pipeline 10*a*. However, the present invention pipeline 10*a* provides a major difference over the prior art in that the PF stage 20 does not need to be flushed, and so there is one less clock cycle penalty in flushing the present invention pipeline 10*a* than one would expect from prior designs.

TABLE 2

| Clock cycle | PFA | IFA | DEA | EXA | WBA | Bhit_I | Bt_I | Berr_E |
|---|---|---|---|---|---|---|---|---|
| C | x2 | x3 | x4 | x5 | x6 | 0 | n/a | 0 |
| C + 1 | x1 | x2 | x3 | x4 | x5 | 0 | n/a | 0 |
| C + 2 | n | x1 | x2 | x3 | x4 | 0 | n/a | 0 |
| C + 3 | n + 1 | n | x1 | x2 | x3 | 1 | t | 0 |
| C + 4 | t + 1 | t | n | x1 | x2 | 0 | n/a | 0 |
| C + 5 | t + 2 | t + 1 | t | n | x1 | 0 | n/a | 1 |
| C + 6 | n + 2 | n + 1 | — | — | n | 0 | n/a | 0 |
| C + 7 | n + 3 | n + 2 | n + 1 | — | — | 0 | n/a | 0 |
| C + 8 | n + 4 | n + 3 | n + 2 | n + 1 | — | 0 | n/a | 0 |

Towards the end of clock cycle C+5, Berr_E 54 goes high, indicating that branch prediction failure occurred. Consequently, rules (3) and (4) take effect in clock cycle C+6. PFA 22 is stuffed with EXA_cr+2, which is simply n+2. IFA 32 is stuffed with EXA_cr+1, which is n+1. Bhit_I 38 in cycle C+6 is forced to zero, regardless of what Bhit_P 28 may have been at the end of cycle C+5. It is clear from Table 2 that only a two cycle stall is incurred in the pipeline 10*a*, despite the fact that there are three stages 20, 30, 40 before the EX stage 50. Hence, the present invention suffers one less pipeline stall than one would expect given the prior art (a two stage stall, rather than a three stage stall).

The above example illustrates what occurs when a predicted branch does not, in fact, occur at the EX stage 50. The other type of branch failure that can occur, however, involves branches that happen at the EX stage 50 and which were not predicted by the PF stage 20. These types of branches similarly induce a pipeline flush. It should be noted that, in this case, rule (3) should more properly read: IFA_nx=EXA_target_cr+1, and PFA_nx=EXA_target_cr+2. In this case, EXA_target address as determined by the EX stage 50. That is, with regards to rule (3), the value "EXA" should be thought of as the correct target instruction that is to be subsequently executed, be it due to branching or not branching. The intentions and implementations thereof for rule (3) should be understood, though, to one skilled in the art.

In the above discussion the use of "zero" as false and "one" as true with regards the values Bhit_P 28, Bhit_I 38, Bhit_D 48, Bhit_E 58 and Berr_E 54 is simply a design choice, and clearly, alternative logic states could be employed.

In contrast to the prior art, the present invention provides a separate pre-fetch stage for implementing branch prediction. Results from the pre-fetch stage are then fed into an immediately subsequent instruction fetch stage that performs the actual instruction fetching. The instruction fetch stage also determines the next contents of the pre-fetch address register and the instruction fetch address register based upon branch prediction results obtained from the pre-fetch stage. Because of this, the pre-fetch address register can behave somewhat independently of the instruction fetch address register. This independence helps to reduce the number of stages that stall when the pipeline must be flushed due to incorrect branch prediction. Further, by requiring the pre-fetch stage to perform only branch prediction, the critical path length of the pre-fetch stage is reduced. CPU core frequencies can therefore be increased accordingly.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pipelined central processing unit (CPU) comprising:

a pre-fetch (PF) stage for performing branch prediction, the PF stage comprising a PF address (PFA) register for storing the address of an instruction being processed by the PF stage;

an instruction fetch (IF) stage for fetching instructions that are to be later processed by an execution (EX) stage, the IF stage comprising an IF address (IFA) register for storing the address of an instruction to be fetched for later execution, and accepting a branch prediction result from the PF stage; and address register control (ARC) circuitry for setting the contents of the PFA and the IFA, the ARC utilizing the branch prediction result held in the IF stage to determine the contents of the PFA and the IFA;

wherein if the branch prediction result held in the IF stage predicts no branching, then the ARC sets a next address of the PFA to be sequentially after a current address of the PFA and a next address of the IFA to be the current address of the PFA, and if the branch prediction result held in the IF stage predicts a branch, then the ARC sets the next address of the PFA to be sequentially after a predicted branch address and simultaneously sets the next address of the IFA to be the predicted branch address.

2. The pipelined CPU of claim 1 wherein the ARC comprises masking circuitry for ignoring a branch prediction result from the PF stage when the branch prediction result held in the IF stage predicts a branch.

3. The pipelined CPU of claim 1 wherein the PF stage immediately precedes the IF stage, and the EX stage is subsequent the IF stage.

4. The pipelined CPU of claim 3 wherein the ARC further accepts a result from the EX stage to set the contents of the IFA and the PFA, wherein if the EX stage determines that an executed instruction has an incorrect branch-prediction result, the ARC sets the next address of the IFA to be sequentially after the executed instruction and simultaneously sets the next address of the PFA to sequentially after the next address of the IFA.

5. The pipelined CPU of claim 3 wherein the ARC further accepts a result from the EX stage to set the contents of the IFA and the PFA, wherein if the EX stage determines that an executed instruction has an incorrect branch-prediction result, the ARC sets the next address of the IFA to a target instruction address as determined by the EX stage, and simultaneously sets the next address of the PFA to sequentially after the next address of the IFA.

6. The pipelined CPU of claim 4 wherein the ARC comprises masking circuitry for ignoring a branch prediction result from the PF stage when the EX stage contains an executed instruction having an incorrect branch-prediction result.

7. A method for pipelining instructions in a central processing unit (CPU), the method comprising:

providing a pre-fetch (PF) stage for performing branch prediction of an instruction pointed to by a pre-fetch address (PFA) register;

providing an instruction fetch (IF) stage for fetching an instruction pointed to by an instruction fetch address (IFA) register that is to be later executed by an execution (EX) stage;

providing a branch prediction result obtained by the PF stage to the IF stage;

setting a next address of the PFA register to be sequentially after a current address of the PFA register, and setting a next address of the IFA register to be the current address of the PFA register, if the branch prediction result predicts no branching; and setting the next address of the PFA register to be sequentially after a predicted branch address, and simultaneously setting the next address of the IFA register to be the predicted branch address, if the branch prediction result predicts a branch.

8. The method of claim 7 further comprising ignoring a current branch prediction result from the PF stage when the previous branch prediction result predicts a branch.

9. The method of claim 7 wherein the PF stage immediately precedes the IF stage, and the EX stage is subsequent the IF stage.

10. The method of claim 9 further comprising:

if the EX stage determines that an executed instruction at a first address was incorrectly branch-predicted, setting the next address of the IFA register to a second address that is sequentially alter the first address, and simultaneously setting the next address of the PFA register to a third address that is sequentially after the second address.

11. The method claim 10 further comprising ignoring a current branch prediction result from the PF stage when the EX stage determines that the executed instruction at the first address was incorrectly branch-predicted.

12. The method of claim 9 further comprising:

if the EX stage determines that an executed instruction at a first address was incorrectly branch-predicted, setting the next address of the IFA register to a second address that is a target address as determined by the EX stage, and simultaneously setting the next address of the PFA register to a third address that is sequentially after the second address.

13. The method claim 12 further comprising ignoring a current branch prediction result from the PF stage when the EX stage determines that the executed instruction at the first address was incorrectly branch-predicted.

14. An electronic circuit for implementing the method of claim 7.

* * * * *